(12) United States Patent
Jones et al.

(10) Patent No.: US 11,101,628 B2
(45) Date of Patent: Aug. 24, 2021

(54) WIRE HARNESS RETAINING SYSTEM

(71) Applicant: Karma Automotive LLC, Irvine, CA (US)

(72) Inventors: James L. Jones, Irvine, CA (US); Javier Hernandez, Irvine, CA (US)

(73) Assignee: KARMA AUTOMOTIVE LLC, Irvine, CA (US)

(*) Notice: Subject to any disclaimer, the term of this patent is extended or adjusted under 35 U.S.C. 154(b) by 0 days.

(21) Appl. No.: 16/702,156

(22) Filed: Dec. 3, 2019

(65) Prior Publication Data

US 2020/0176965 A1 Jun. 4, 2020

Related U.S. Application Data

(60) Provisional application No. 62/775,333, filed on Dec. 4, 2018.

(51) Int. Cl.
*H02G 3/32* (2006.01)
*H02G 3/34* (2006.01)
*B60R 16/02* (2006.01)

(52) U.S. Cl.
CPC .......... *H02G 3/32* (2013.01); *B60R 16/0215* (2013.01); *H02G 3/34* (2013.01)

(58) Field of Classification Search
CPC . H02G 3/32; H02G 3/34; H02G 3/305; B60R 16/0215; B60R 16/0207; H01B 7/0045
USPC ....................................................... 174/72 A
See application file for complete search history.

(56) References Cited

U.S. PATENT DOCUMENTS

| | | | |
|---|---|---|---|
| 4,871,134 A * | 10/1989 | Oikawa | H02G 3/26 248/65 |
| 5,806,812 A | 9/1998 | Jacobs et al. | |
| 5,915,424 A * | 6/1999 | Franks | H01B 13/01209 140/92.1 |
| 5,921,510 A * | 7/1999 | Benoit | F16L 3/2334 248/71 |
| 6,042,062 A * | 3/2000 | Sugiyama | B60R 16/0215 174/72 A |
| 6,417,451 B1 * | 7/2002 | Uchiyama | B60R 16/0215 174/72 A |

(Continued)

FOREIGN PATENT DOCUMENTS

EP 1 722 454 B1 9/2011

OTHER PUBLICATIONS

"Cable Tie-Mounts and Hooks for Sheetmetal"; PEMLINE Newsletter; 2019 Penn Engineering; PMA; https://www.pemnet.com/fastening-products/cable-tie-mounts-and-hooks-for-sheetmetal/; 2 pages.

*Primary Examiner* — Timothy J Thompson
*Assistant Examiner* — Michael F McAllister
(74) *Attorney, Agent, or Firm* — Gordon Rees Scully Mansukhani, LLP (57) ABSTRACT

A cable management system for a cable system of a vehicle. The cable management system including a retainer having rails configured to be attached to a wire harness of the cable system. The wire harness may include cable ties that comprise of a plug configured to attach to a vehicle frame. The wire harness may also include an edge clip to also aid in the fastening of the wire harness to the vehicle. The wire harness may also include component cables attached similarly to the vehicle.

20 Claims, 7 Drawing Sheets

(56) References Cited

U.S. PATENT DOCUMENTS

| | | | | |
|---|---|---|---|---|
| 7,533,853 B2* | 5/2009 | Ogawa | ............... | B60R 16/0215 |
| | | | | 248/73 |
| 7,793,895 B2* | 9/2010 | Franks | ................... | F16B 19/00 |
| | | | | 248/74.3 |
| 8,653,372 B2* | 2/2014 | Muneyasu | ........... | H01B 7/0045 |
| | | | | 174/11 OR |
| 9,512,940 B2* | 12/2016 | Blakeley | ............. | B60R 16/0215 |
| 10,196,013 B2* | 2/2019 | Pantino | .................... | F16L 3/12 |
| 10,399,516 B2* | 9/2019 | Chapman | ............ | B60R 16/0215 |
| 2001/0010349 A1* | 8/2001 | Sakakura | .................. | F16L 3/23 |
| | | | | 248/68.1 |
| 2002/0129961 A1* | 9/2002 | Baker | ................ | B60R 16/0215 |
| | | | | 174/72 A |
| 2007/0187144 A1* | 8/2007 | Kato | .................. | B60R 16/0215 |
| | | | | 174/72 A |
| 2010/0127135 A1* | 5/2010 | Stocker | ..................... | F16L 3/18 |
| | | | | 248/70 |
| 2017/0349121 A1* | 12/2017 | Pantino | .............. | B60R 16/0215 |

\* cited by examiner

WIRE HARNESS RETAINING SYSTEM

CROSS-REFERENCE TO RELATED APPLICATION

This application claims priority to and the benefit of U.S. Provisional Patent Application No. 62/775,333 filed Dec. 4, 2018, which is incorporated by reference herein in its entirety.

BACKGROUND

The present disclosure relates to a device for anchoring a cable tie and fastener to a wire harness.

Modern vehicles include electronic cabling or wires for a variety of purposes. These cables are often bundled together for ease of assembly. This bundling is commonly known in the automotive industry as a "wire harness".

The process of assembling and installing wire harnesses as vehicular components is a complex and challenging one. Although much of modern vehicular assembly is automated, wire harnesses remain complicated enough that manual assembly and installation are more cost-effective choices. Part of the complexity in assembling wire harnesses comes from the process of installing a wire harness to a vehicle frame. Rather than have a wire harness loosely positioned within a vehicle, it is desirable to fix the wire harness to the vehicle frame to reduce space requirements and reduce the risk of a short circuit or other fault. Many wire harnesses are assembled with a plurality of fasteners along their lengths to facilitate installation and connection to the frame, but aligning these fasteners with attachment points on a vehicle frame is an error-prone process. Due to the manual nature and other factors of wire harness assembly, these fasteners are rarely spaced along the length of the wire harness in an optimal fashion. The amount of wire harness slack between fasteners may not be enough to cover the distance between vehicle frame attachment points, or the slack may be so much as to render the wire harness unmanageable and result in the wire harness being so loose that it poses the same challenges as an unfixed wire harness.

It is desirable to find a device that allows the fasteners along the length of a wire harness freedom of movement without moving along the length of the wire harness itself.

SUMMARY

Disclosed herein is a system and an alignment device for anchoring a cable tie to a wire harness such that the cable tie has freedom of movement but will not travel more than a limited distance along the length of the wire harness. In one embodiment, the alignment device includes a slot allowing a cable tie to pass and/or loop through the device and the wire harness to which the device is attached. In one embodiment, this cable tie may be attached to a plug type fastener. The alignment device may include rails to facilitate attachment by a set of adhesive strips. In one embodiment, the adhesive strips may be the adhesive strips used to bind together the component cables or wires of the wire harness and the alignment device may be installed to the wire harness during the assembly of the wire harness. In one embodiment, the alignment device may include an adhesive layer alongside its wire harness contact points.

In one embodiment, the slot of the alignment device may comprise three walls instead of four. For example, the exterior surface of the wire harness may serve as one of the boundaries of the slot.

In one embodiment, a cable tie may be looped through the slot of the alignment device before being fastened to a vehicle frame. The cable tie may be tightened after the cable tie is anchored to the vehicle frame by a fastener.

In one embodiment, the alignment device may be fastened to a component cable of a wire harness.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 1A-1D depict an exemplary embodiment of a wire harness retainer or alignment device, wherein

DETAILED DESCRIPTION

One aspect of the disclosed embodiments of the alignment device is directed to anchoring a cable tie to a wire harness such that the cable tie has freedom of movement but will not travel along the length of the wire harness.

References throughout this document to "one embodiment," "certain embodiments," "an embodiment," or similar terms mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics disclosed herein may be combined in any suitable manner in one or more embodiments without limitation. For example, two or more of the innovative devices described herein may be combined in a single device, but the application is not limited to the specific exemplary combinations of improvements to wire harness retention that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. The character "N" refers hereinafter to the last member of a set or the total count of members in a set. The character "X" refers hereinafter to a variable member of a set. The characters "A", "B", "C", etc. refer to a specific but otherwise undefined member of a set.

Exemplary embodiments are described further below. It is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
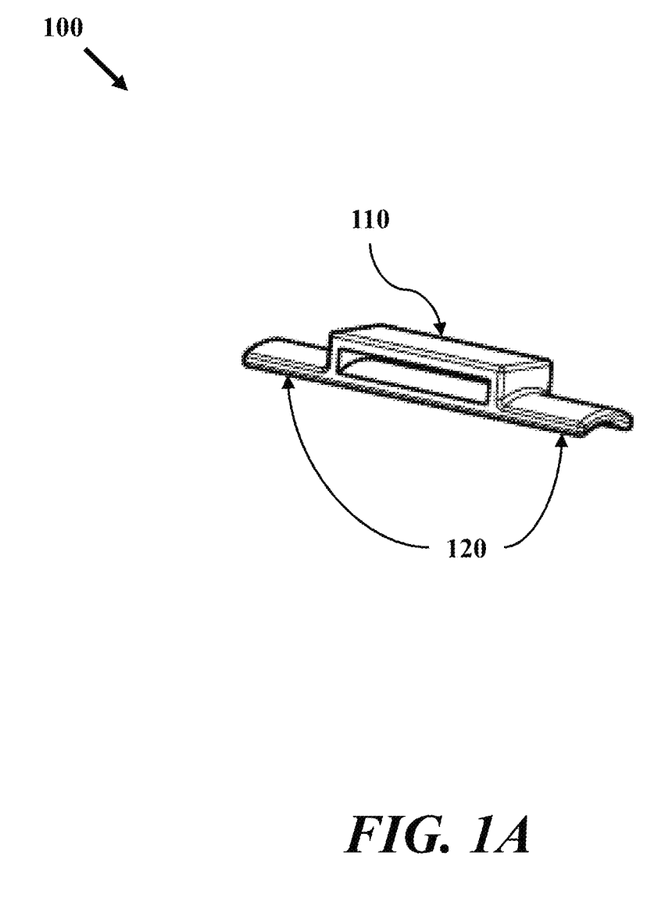
FIG. 1A depicts a perspective view of the embodiment.

FIG. 1A depicts a perspective view of an exemplary embodiment of a wire harness retainer or alignment device 100. In one embodiment, the wire harness retainer 100 includes a slot frame 110 and a pair of rails 120 on either side of the slot. According to one embodiment, the slot frame 110 is designed to accommodate a cable tie, while the pair of rails 120 is designed to allow the wire harness retainer 100 to be fastened to a wire harness 210 (see FIG. 2) by a number of means, including but not limited to binding each rail 120 to the wire harness using adhesive strips or tape. In one embodiment, the wire harness retainer 100 may include an adhesive layer alongside its wire harness 210 contact points in order to facilitate attachment.

In one embodiment, the slot frame 110 may be comprised of three sides instead of four, such that the slot frame 110 does not include material in contact with the wire harness 210 apart from the pair of rails 120. This embodiment may save material in producing the slot frame 110 by allowing the wire harness 210 itself to serve as the fourth side or lower boundary of the slot.

Figure 1B:
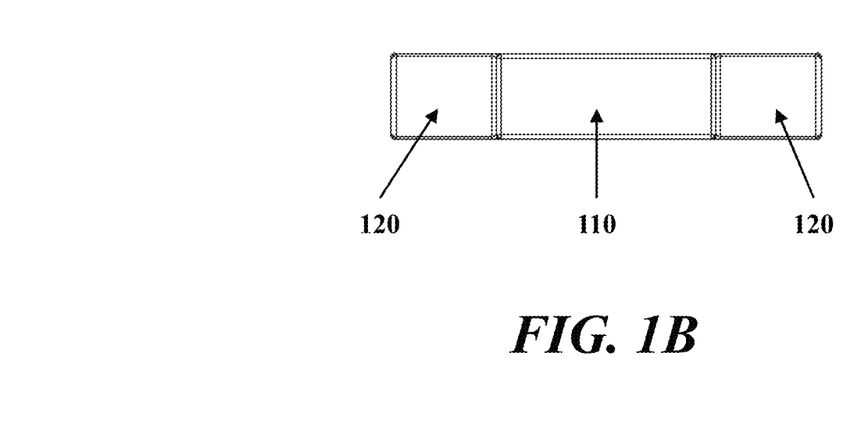
FIG. 1B depicts a top view of the embodiment.

FIG. 1B depicts a top view of an exemplary embodiment of a wire harness retainer 100. According to one embodiment, the wire harness retainer is 45.4 millimeters long and 9 millimeters wide.

Figure 1C:
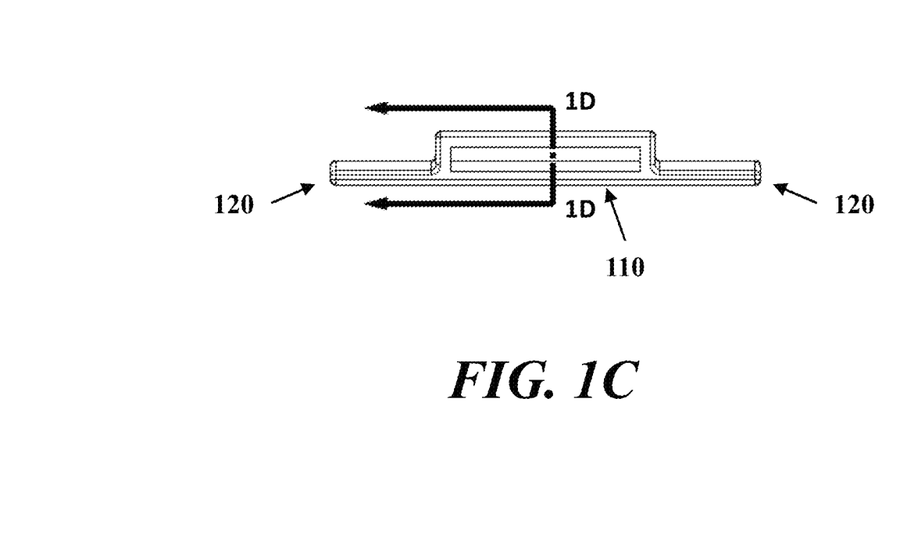
FIG. 1C depicts a side view of the embodiment.

FIG. 1C depicts a side view of an exemplary embodiment of a wire harness retainer 100. According to one embodiment, the length of each of the pair of rails 120 is 11.11 millimeters.

Figure 1D:
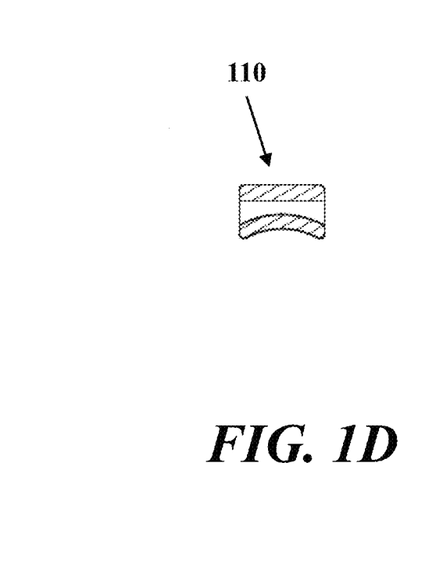
FIG. 1D depicts a sectioned view of the embodiment.

FIG. 1D depicts a sectioned view of an exemplary embodiment of a wire harness retainer 100. According to one embodiment, the height of the wire harness retainer 100 is 5.59 millimeters. According to one embodiment, the clearance of the slot frame 110 for accommodating a cable tie is 1.5 millimeters. According to one embodiment, the thickness of the walls of the slot frame 110 is 1.59 millimeters. According to one embodiment, the underside of the wire harness retainer 100 may be concave to accommodate attaching to a curved surface such as a wire harness 210. In one embodiment, the radius of the concave underside is 7.94 millimeters.

Figure 2:
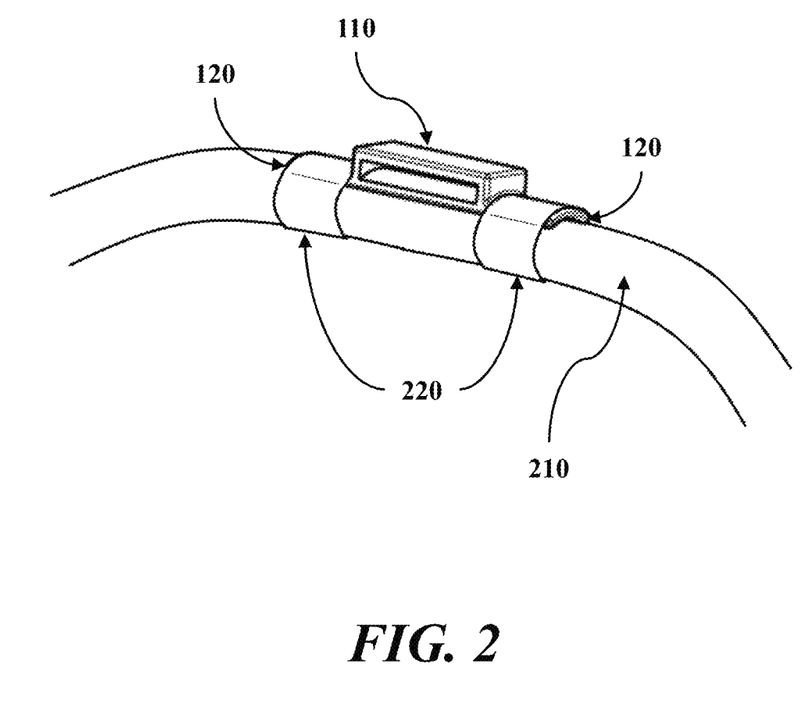
FIG. 2 depicts a perspective view of the wire harness retainer of FIG. 1 attached to a wire harness.

FIG. 2 depicts a perspective view of the wire harness retainer 100 attached to a wire harness 210 according to one or more embodiments. In one embodiment, adhesive strips bind the pair of rails 120 to the wire harness 210. In another embodiment, the adhesive strips 220 binding the pair of rails 120 to the wire harness 210 are part of the binding holding the wire harness 210 together such that the component cables $215_{1-N}$ of the wire harness 210 do not separate. In this embodiment, it may be possible to save assembly time by integrating the process of attaching the wire harness retainer 100 with the process of bundling the components of the wire harness 210.

Figure 3:
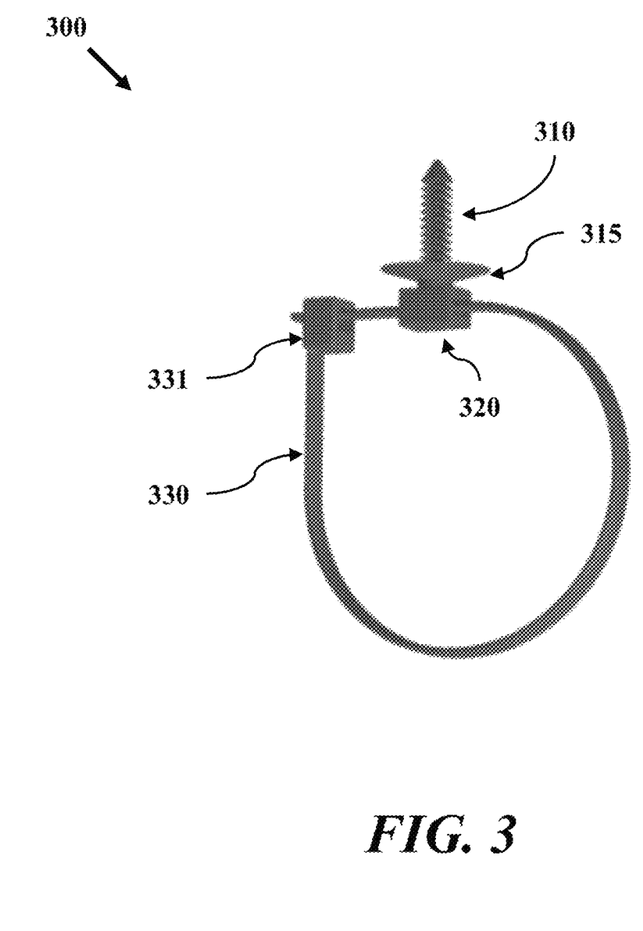
FIG. 3 depicts a side view of a cable tie and fastener.

FIG. 3 depicts a side view of the cable tie fastener 300 according to one or more embodiments. The cable tie fastener 300 is comprised of a plug type fastener 310 (e.g., a Christmas tree type plug), a stop 315, a fastener retainer 320, a cable tie 330, and a cable tie ratchet 331. In one embodiment, the plug 310 may be designed to attach to a hole in the side of a vehicle frame; in one or more embodiments the plug 310 is the means of holding the wire harness 210 securely to the vehicle frame, wherein the hole in the side of the vehicle frame serves as an attachment point for the wire harness retainer 100. The plug 310 may have a series of ridges and a tapered end to assist with fastening the cable tie fastener 300 to the attachment point. The plug 310 may include a stop 315 to prevent the plug 310 end from inserting into the hole in the side of the vehicle frame so deeply as to completely pass through it. On the other end of the plug 310 is a fastener retainer 320 designed to accommodate the cable tie 330, according to one or more embodiments. The cable tie 330 may move freely through a slot in the fastener retainer 320 while remaining attached to it, according to one or more embodiments. The cable tie 330 may include a cable tie ratchet 331 at one end; the cable tie 330 may be designed such that the other end may pass through the cable tie ratchet 331 and lock into place forming a loop that will not come undone.

The cable tie 330 is tightened around the wire harness to secure the wire harness to the vehicle frame via the fastener 310. The retainer or alignment device 100 does not form any part of the structural integrity of the connection of the wire harness to the vehicle frame because the cable tie passes through the slot and is secured to the wire harness 210 and not the retainer or alignment device 100. The retainer or alignment device 100 only serves to properly position the cable tie and fastener 300 along the length of the wire harness 100.

Figure 4:
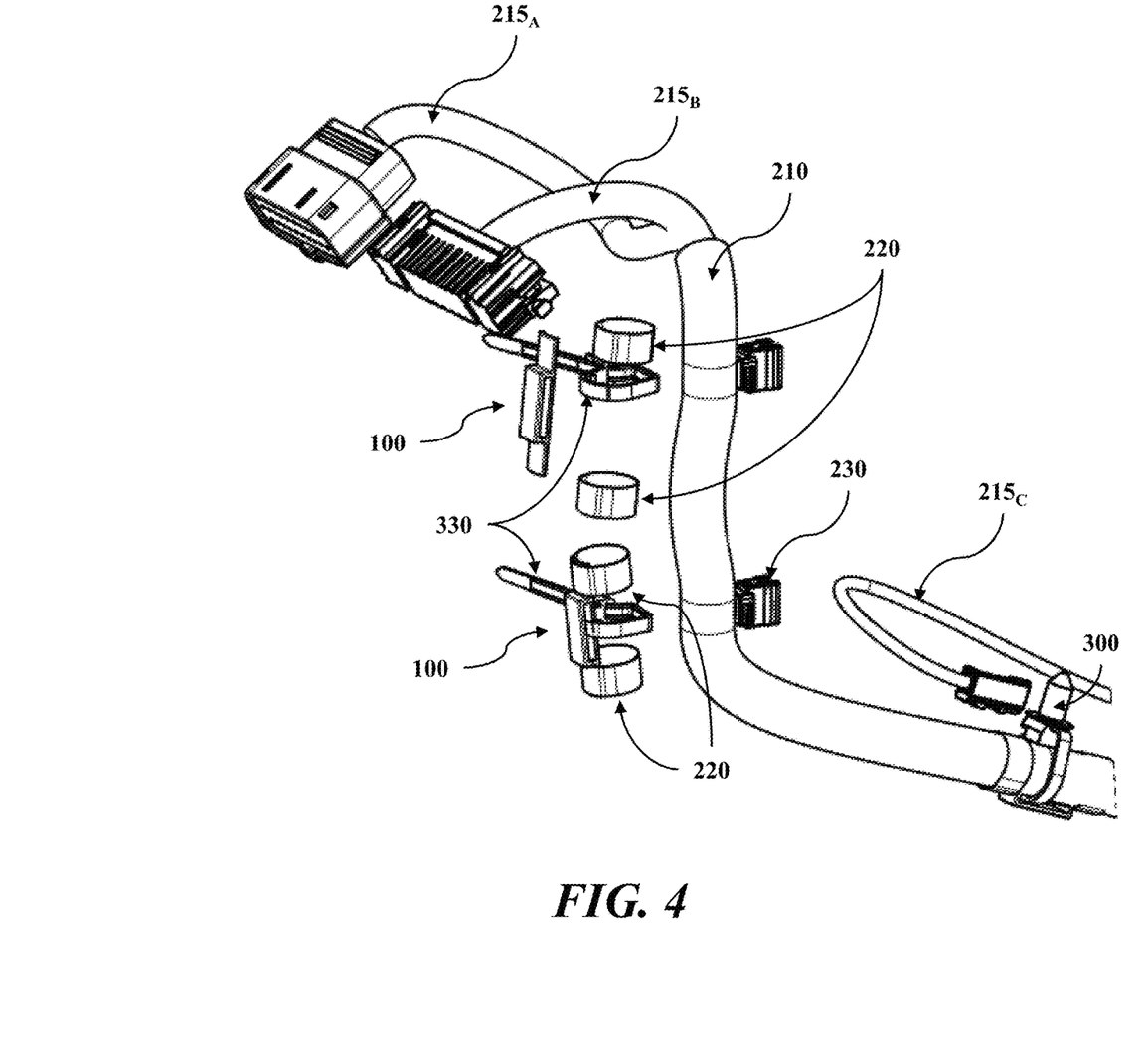
FIG. 4 depicts an exploded perspective view of a wire harness with a plurality of wire harness retainers or alignment devices installed along the length of the harness.

FIG. 4 depicts an exploded perspective view of a wire harness 210 with a plurality of wire harness retainers 100 installed along its length according to one or more embodiments. The plurality of wire harness retainers 100 may be fastened in one or more locations along the length of the wire harness 210, with the locations roughly corresponding to an attachment point on a vehicle frame. In one embodiment, a plurality of adhesive strips 220 may be used to fasten the plurality of wire harness retainers 100 to the wire harness 210.

According to one embodiment, each of the plurality of wire harness retainers 100 corresponds to one of a plurality of cable tie fasteners 300. In one embodiment, a plurality of cable ties 330 may be looped through the slot frames 110 of the plurality of wire harness retainers 100; this plurality of cable ties 330 may be used to fasten the wire harness 210 to the vehicle frame by means of a corresponding member of the plurality of cable tie fasteners 300. In one embodiment, each of the plurality of cable tie fasteners 300 may secure itself to an attachment point on the vehicle frame by means of a tree type plug 310 (see FIG. 3).

In one embodiment, the plurality of cable ties 330 may loop through a corresponding fastener retainer 320 (see FIG. 3). One or more of the plurality of cable ties 330 may be tightened after looping through both one of the plurality of fastener retainers 320 and the slot frame 110 of a corresponding member of the plurality of wire harness retainers 100. In one embodiment, the cable tie ratchet 331 of each of the plurality of cable ties 330 may hold the cable ties 330 in place, thereby securing the cable tie 330 to itself, forming a loop that may hold each of the plurality of wire harness retainers 100 roughly adjacent to its corresponding member of the plurality of cable tie fasteners 300.

The plug 310 of one of the plurality of cable tie fasteners 300 may be secured to the attachment point of the vehicle frame before the corresponding cable tie 330 loop is formed and tightened. In another embodiment, one or more of the plurality of cable ties 330 forms a loose loop connecting one of the plurality of wire harness retainers 100 to its corresponding cable tie fastener 300 before each cable tie fastener 300 is attached to a corresponding attachment point of the vehicle frame. In this embodiment, the cable tie 330 is tightened after both the loop is formed and the cable tie fastener 300 is secured to the vehicle frame.

The component cables $215_{1-N}$ of the wire harness 210 may diverge from the bundle at either end of the wire harness 210 to facilitate being connected to their separate endpoints. In one embodiment, the end of a component cable $215_X$ (such as component cable $215_C$) may diverge from the wire harness 210 along the length of the wire harness 210 instead of either end.

The wire harness 210 may include a plurality of edge clips 230 to facilitate an alternate means of attaching the wire harness 210 to an attachment point, or to facilitate attaching a cable that is not one of the plurality of component cables $215_{1-N}$ along the full or partial length of the wire harness 210.

Figure 5:
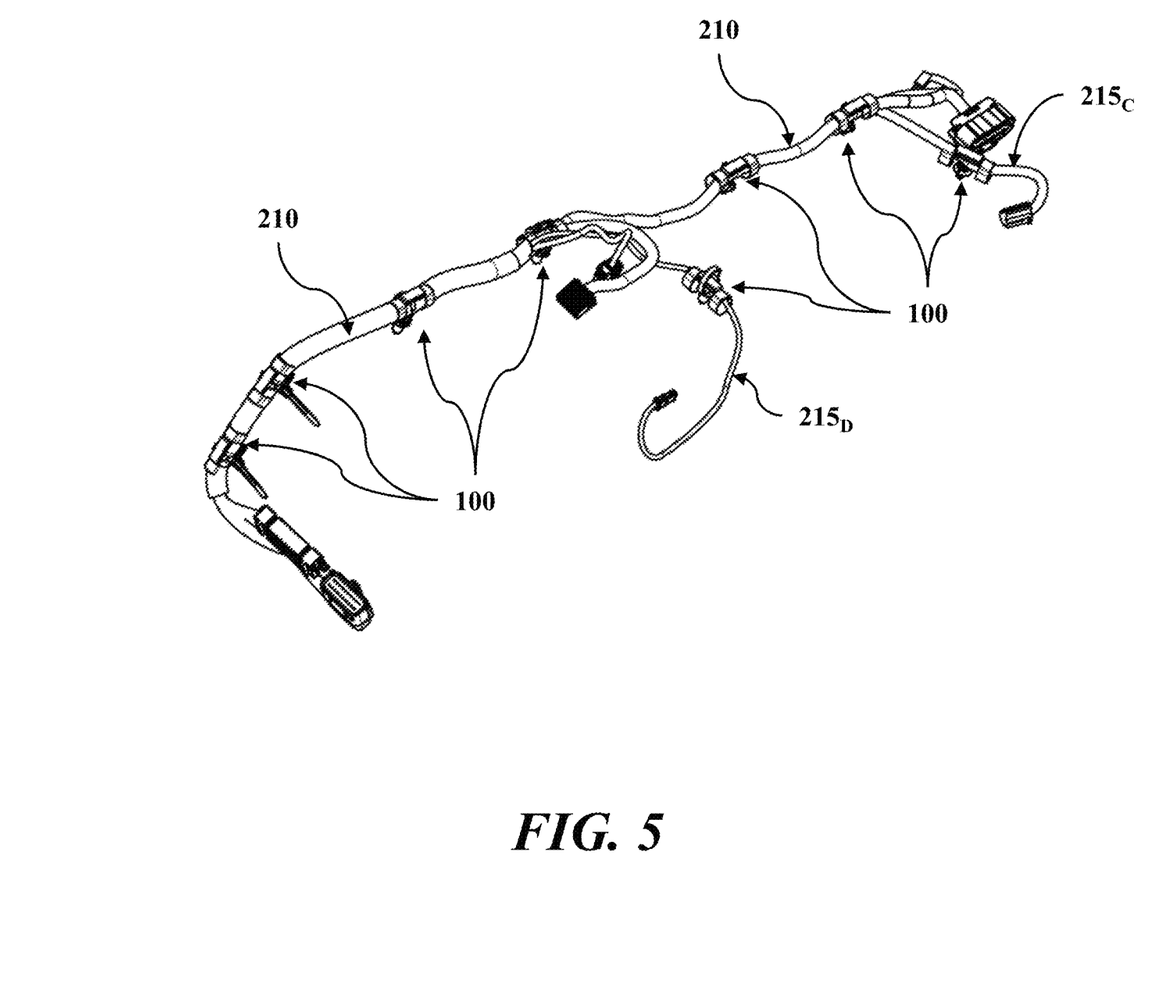
FIG. 5 depicts a perspective view of a wire harness with a plurality of wire harness retainers installed along its length and along the length of one or more of its component cables.

FIG. 5 depicts a perspective view of a wire harness 210 with a plurality of wire harness retainers or alignment devices 100 installed along its length and along the length of one or more of its component cables $215_X$ according to one or more embodiments. Each of the plurality of wire harness retainers 100 may be spaced apart from each other irregularly along the length of the wire harness 210. The cable ties 330 of FIGS. 3 and 4 may be loosely looped through each of the slot frames 110 of the plurality of wire harness retainers 100 so as to facilitate easy installation of the wire harness alongside the vehicle frame.

In one embodiment, there may also be one or more wire harness retainers 100 installed along the lengths of one or more component cables $215_{1-N}$ of the wire harness 210. This may allow for individual component cables $215_X$ to benefit from the advantages of the wire harness retainer 100 even while following a path separate from the wire harness 210.

Figure 6:
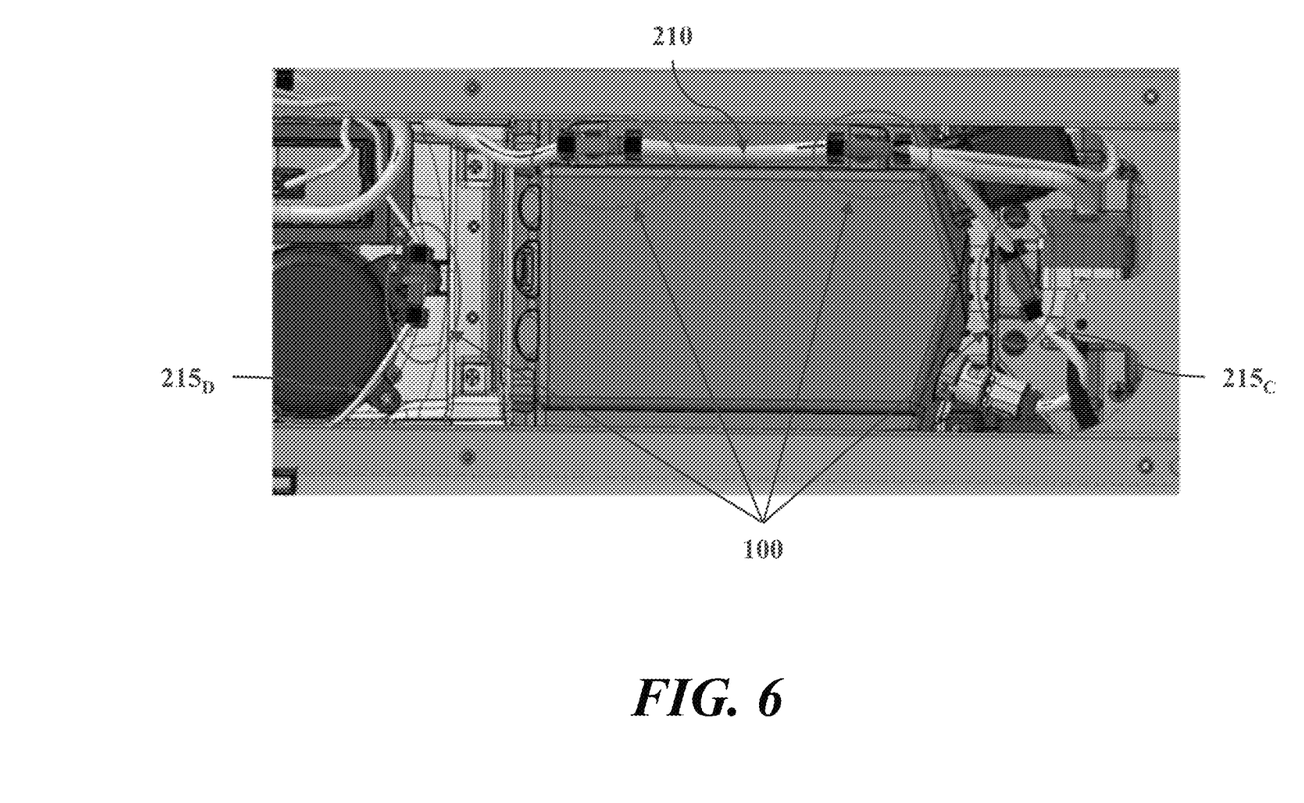
FIG. 6 depicts a view of a wire harness fastened to and running along a length of a vehicle frame.

FIG. 6 depicts a side view of a wire harness 210 fastened to and running along a length of a vehicle frame. In one embodiment, the wire harness 210 may be fixed to the side of the vehicle frame by means of one or more wire harness retainers 100. One or more of the wire harness 210 component cables $215_C$ and $215_D$ may also be fixed to the side of the vehicle frame by means of one or more wire harness retainers 100. In one embodiment, the one or more wire harness retainers 100 may have a cable tie fastener 300 (see FIG. 3) fastening them to the side of the vehicle frame.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the wire harness system shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A cable system comprising:
   a wire harness including at least one component cable;
   at least one retainer configured to be attached to the wire harness, wherein the at least one retainer includes a slot frame and a pair of rails disposed on opposite sides of the slot frame;
   a cable tie inserted into the slot frame of each retainer of at least one retainer, wherein the cable tie is configured to fasten the at least one retainer to the wire harness and wherein the cable tie is attached to a fixed frame;
   a pair of adhesive strips configured to fasten each retainer of the at least one retainer to the wire harness at corresponding rails of the pair of rails; and
   wherein the cable tie and the pair of adhesive strips is circumferentially disposed around the wire harness and wherein said cable tie is capable of moving relative to the wire harness within a width of the slot frame such that the wire harness is allowed to move relative to the fixed frame.

2. The cable system of claim 1, further comprising a plug fastener including a plug having at least one ridge and a tapered end, a retainer located at one end of the plug configured to accommodate and attach to the cable tie, and a stop configured to prevent the plug from passing through an attachment point and hold the plug at the attachment point.

3. The cable system of claim 2, wherein the attachment point is a hole on a frame of a vehicle.

4. The cable system of claim 1, further comprising:
a component cable retainer configured to be attached to the at least one component cable, wherein the component cable retainer includes a cable retainer slot frame and a pair of cable retainer rails disposed on opposite sides of the cable retainer slot frame; and
a pair of cable retainer adhesive strips configured to fasten each component cable retainer to the at least one component cable at corresponding rails of the pair of cable retainer rails.

5. The cable system of claim 4, further comprising:
a component cable tie inserted to the cable retainer slot frame, wherein the component cable tie is configured to fasten the component cable retainer to the at least one component cable.

6. The cable system of claim 1, further comprising at least one edge clip attached to the wire harness, wherein the at least one edge clip is configured to fasten the wire harness at an attachment point.

7. The cable system of claim 6, wherein the attachment point is on a frame of a vehicle.

8. A fastening system comprising:
at least one retainer configured to be attached to a wire harness, wherein the at least one retainer includes a slot frame and a pair of rails disposed on opposite sides of the slot frame;
a cable tie inserted into the slot frame of each retainer of at least one retainer, wherein the cable tie is configured to fasten the at least one retainer to the wire harness and wherein the cable tie is attached to a fixed frame;
a pair of adhesive strips configured to fasten each retainer of the at least one retainer to the wire harness;
wherein the cable tie and the pair of adhesive strips is circumferentially disposed around the wire harness; and
wherein said cable tie is capable of moving relative to the wire harness within a width of the slot frame such that the wire harness is allowed to move relative to the fixed frame.

9. The fastening system of claim 8, further comprising a plug fastener including a plug having at least one ridge and a tapered end, a retainer located at one end of the plug configured to accommodate and attach to the cable tie, and a stop configured to prevent the plug from passing through an attachment point of the fixed frame and hold the plug at the attachment point.

10. The cable system of claim 9, wherein the attachment point of the fixed frame is a hole on a frame of a vehicle.

11. The cable system of claim 8, further comprising:
at least one component cable extending from the wire harness;
a component cable retainer configured to be attached to the at least one component cable, wherein the component cable retainer includes a cable retainer slot frame and a pair of cable retainer rails disposed on opposite sides of the cable retainer slot frame; and
a pair of cable retainer adhesive strips configured to fasten each component cable retainer to the at least one component cable at corresponding rails of the pair of cable retainer rails.

12. The cable system of claim 11, further comprising:
a component cable tie inserted to the cable retainer slot frame, wherein the component cable tie is configured to fasten the component cable retainer to the at least one component cable.

13. The cable system of claim 8, further comprising at least one edge clip attached to the wire harness, wherein the at least one edge clip is configured to fasten the wire harness at an attachment point.

14. The cable system of claim 13, wherein the attachment point is on a frame of a vehicle.

15. A vehicle comprising:
a vehicle frame having at least one attachment point;
a cable system having a wire harness including at least one component cable;
at least one retainer configured to be attached to the wire harness, wherein the at least one retainer includes a slot frame and a pair of rails disposed on opposite sides of the slot frame;
a cable tie inserted into the slot frame of each retainer of at least one retainer, wherein the cable tie is configured to fasten the at least one retainer to the wire harness;
a pair of adhesive strips configured to fasten each retainer of the at least one retainer to the wire harness;
wherein the cable tie and the pair of adhesive strips is circumferentially disposed around the wire harness;
wherein the wire harness is fastened to the vehicle frame at the at least one attachment point via the cable tie; and
wherein said cable tie is capable of moving relative to the wire harness within a width of the slot frame such that the wire harness is allowed to move relative to the at least one attachment point of the vehicle.

16. The vehicle of claim 15, further comprising a plug fastener including a plug having at least one ridge and a tapered end, a retainer located at one end of the plug configured to accommodate and attach to the cable tie, and a stop configured to prevent the plug from passing through the attachment point and hold the plug at the attachment point, wherein the plug fastener is configured to fasten the wire harness to the vehicle frame.

17. The vehicle of claim 15, further comprising at least one edge clip attached to the wire harness, wherein the at least one edge clip is configured to fasten the wire harness to the vehicle frame.

18. The vehicle of claim 15, wherein the at least one component cable is a plurality of components cables extending from the wire harness, wherein each component cable of the plurality of component cables includes a component cable retainer configured to attach each component cable of the plurality of component cables to the vehicle frame.

19. The vehicle of claim 18, wherein the component cable retainer includes a cable retainer slot frame and a pair of cable retainer rails disposed on opposite sides of the cable retainer slot frame; and
a pair of cable retainer adhesive strips configured to fasten each component cable retainer to each component cable of the plurality of component cables at corresponding rails of each pair of cable retainer rails.

20. The vehicle of claim 19, further comprising a component cable tie configured to attach to the cable retainer slot frame.

* * * * *